United States Patent
Blackwood (10) Patent No.: US 9,619,680 B2
(45) Date of Patent: Apr. 11, 2017

(54) SELF-IDENTIFYING CONTROL SWITCH

(71) Applicant: Eaton Corporation, Cleveland, OH (US)

(72) Inventor: Andrew James Blackwood, Waukesha, WI (US)

(73) Assignee: Eaton Corporation, Cleveland, OH (US)

( * ) Notice: Subject to any disclaimer, the term of this patent is extended or adjusted under 35 U.S.C. 154(b) by 38 days.

(21) Appl. No.: 14/584,118

(22) Filed: Dec. 29, 2014

(65) Prior Publication Data

US 2016/0188928 A1 Jun. 30, 2016

(51) Int. Cl.
*H04Q 5/22* (2006.01)
*G06K 7/10* (2006.01)
*H01H 23/12* (2006.01)
*H01H 9/18* (2006.01)
*H01H 9/16* (2006.01)
*H01H 23/28* (2006.01)

(52) U.S. Cl.
CPC ..... *G06K 7/10366* (2013.01); *G06K 7/10316* (2013.01); *H01H 9/168* (2013.01); *H01H 9/18* (2013.01); *H01H 23/12* (2013.01); *H01H 23/28* (2013.01); *H01H 2221/016* (2013.01); *H01H 2231/026* (2013.01); *H01H 2300/032* (2013.01); *Y02B 90/224* (2013.01); *Y04S 20/14* (2013.01)

(58) Field of Classification Search
CPC ................ G06K 7/10366; G06K 7/10316
USPC .................. 340/10.1, 10.5, 10.51; 235/375
See application file for complete search history.

(56) References Cited

U.S. PATENT DOCUMENTS

| 5,081,586 | A | * | 1/1992 | Barthel | ............... B60R 16/0315 307/10.1 |
| 6,147,420 | A | | 11/2000 | Roser | |
| 6,346,885 | B1 | * | 2/2002 | Curkendall | .......... A01K 11/007 340/10.1 |
| 7,994,924 | B2 | * | 8/2011 | Brandt | ................... H01H 9/168 340/572.1 |
| 2006/0006986 | A1 | | 1/2006 | Gravelle et al. | |
| 2007/0139216 | A1 | | 6/2007 | Breed | |

(Continued)

FOREIGN PATENT DOCUMENTS

DE 102013211015 A1 12/2014
JP 2009123595 A 6/2009

*Primary Examiner* — Qutbuddin Ghulamali
(74) *Attorney, Agent, or Firm* — Ziolkowski Patent Solutions Group, SC (57) ABSTRACT

A vehicle communication system includes a switch module having a plurality of control switches, each of the control switches including a rocker button actuatable between an off position and an activated position, and an RFID tag secured to the rocker button, the RFID tag including thereon a unique identifier tied to a function of the control switch. The vehicle communication system also includes an RFID reader that receives switch messages from RFID tags whose respective rocker button is in an activated position, each switch message including the unique identifier for its respective RFID tag. The vehicle communication system also includes a vehicle communications link that is connected to the RFID reader to receive switch messages therefrom, the vehicle communications link providing the switch messages to a vehicle controller for purposes of controlling vehicle outputs associated with the switch messages.

18 Claims, 4 Drawing Sheets

(56) References Cited

U.S. PATENT DOCUMENTS

| | | | |
|---|---|---|---|
| 2007/0142155 A1* | 6/2007 | Schumacher | B60K 23/04 475/150 |
| 2010/0079289 A1 | 4/2010 | Brandt et al. | |
| 2010/0314226 A1 | 12/2010 | Patel et al. | |
| 2013/0113599 A1 | 5/2013 | Chapman | |
| 2014/0265640 A1 | 9/2014 | Ruff | |

* cited by examiner

SELF-IDENTIFYING CONTROL SWITCH

BACKGROUND OF THE INVENTION

The present invention relates generally to electrical switches for use in motor vehicles and, more particularly, to vehicle switches having a self-identifying switch function. The self-identifying feature of the switches enables the placement of switches in any of a number of locations consistent with a customer's desired switch customization requirement, while providing for the identification of a switch regardless of its location, such that switches can be placed in any position within a defined network on the vehicle without changing the switch's functionality or the system wiring.

Electrical switches are used in motor vehicles as control switches for switching the motor vehicle lighting, the windshield wipers, the rear windshield heating, the cruise control functions, the internal central locking and other functions on and off. A number of such switches can be combined as control panels in the dashboard, in the center console or the like. In specialty vehicle markets—such as heavy trucks, agricultural equipment, and construction equipment, for example—many original equipment manufacturers (OEMs) produce custom dashboards for their customers. In doing so, the OEMs allow the customers to pick options as well as their associated switch locations. While such customization is desirable from the standpoint of the customer, such customization leads to significant overhead expenses for the OEMs with respect to managing customer options for the dashboards. That is, present methods of managing production for customer dashboards having customized options and associated switch locations requires separate drawings and wire harnesses for every vehicle manufactured. Furthermore, some OEMs may even install the wires for every option sold, but only connect the wires used with the individual customer dashboard order.

In the mix of switch functions, some switches provide input signals to a vehicle's microprocessor-based controller, often referred to as a body controller, or electronic controller unit (ECU), which receives the signal and makes logic decisions regarding how that function is to be performed or activated. Other switches are wired directly to their intended loads. Those switches providing an ECU input typically operate at very low current, typically in the range of 5 to 20 milliAmperes (mA), whereas direct-wired switches may handle loads up to 20 Amperes or more. Different contact materials are needed to accommodate these varying load ranges, as well as different sized wires and connectors. The arrangement or rearrangement of switches within the dashboard array is often limited in practice by the ability of the OEM to provide appropriate high current and low current wiring to support the desired functions. It is also common for OEMs to provide the same type of electrical connector and wires for all switch positions for economy and standardization, though the practice can result in a higher percentage of wiring errors at the time the vehicle is being assembled.

It would therefore be desirable to design a system that enables OEMs to reduce the cost of managing a custom dashboard. In doing so, the system and method would allow for dashboard customization without requiring the OEM to rewire/relocate the wire harnesses to accommodate the customization—thereby enabling vehicle OEMs to significantly reduce the engineering overhead and the wire count associated with a custom dashboard.

BRIEF DESCRIPTION OF THE INVENTION

Embodiments of the present invention provide a vehicle control switches that provides a self-identifying switch function. The switches may be placed in any of a number of locations consistent with a customer's desired switch customization requirement, while providing for the identification of a switch regardless of its location, such that switches can be placed in any position within a defined network on the vehicle without changing the switch's functionality or the system wiring.

In accordance with one aspect of the invention, a vehicle communication system includes a switch module having a plurality of control switches, each of the plurality of control switches further including a rocker button actuatable between an off position and an activated position and a radio frequency identification (RFID) tag secured to the rocker button, the RFID tag including thereon a unique identifier tied to a function of the control switch. The vehicle communication system also includes an RFID reader configured to receive switch messages from RFID tags whose respective rocker button is in an activated position, each switch message including the unique identifier for its respective RFID tag. The vehicle communication system further includes a vehicle communications link connected to the RFID reader to receive switch messages therefrom, the vehicle communications link providing the switch messages to a vehicle controller for purposes of controlling vehicle outputs associated with the switch messages.

In accordance with another aspect of the invention, a vehicle control switch includes a rocker button actuatable between an off position and one or more activated positions and one or more radio frequency identification (RFID) tag secured to an underside of the rocker button, with an RFID tag being provided for each of the one or more activated positions of the rocker button, and wherein each of the one or more RFID tags includes thereon a unique address tied to a function of the control switch in its respective activated position. The vehicle control switch also includes a switch contact coupled to each of the one or more RFID tags and to the rocker button such that the switch contact moves with the rocker button when actuated between the off position and the one or more activated positions and one or more antennas selectively in operable communication with the one or more RFID tags based on a position of the switch contact associated with each respective RFID tag. A communications path between an RFID tag and an antenna is formed by a respective switch contact when the rocker button is in one of the one or more activated positions, thereby causing the antenna to transmit a switch signal to an RFID reader remote from the vehicle control switch, the switch signal including therein the unique address of the RFID tag.

In accordance with yet another aspect of the invention, a vehicle communication system includes a plurality of control switches selectively operable to control vehicle functions or loads in a desired manner, each of the plurality of control switches further including a rocker button actuatable between an off position and one or more activated positions, one or more radio frequency identification (RFID) tags secured to an underside of the rocker button each having stored thereon a unique address indicative of a function of the control switch, and one or more antennas operable with the one or more RFID tags to transmit switch messages including the address of the RFID tag indicative of a function of the control switch, wherein actuation of the rocker button between the off position and the one or more activated positions selectively connects and disconnects the one or more antennas from respective ones of the one or more RFID tags. The vehicle communication system also includes an RFID reader configured to transmit interrogator signals to each of the RFID tags in the plurality of control switches and, responsive to the interrogator signals, receive switch messages from each RFID tag connected to its respective antenna based on actuation of the respective rocker button to an activated position, each switch message including the unique address for its respective RFID tag.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Embodiments of the invention are directed to vehicle control switches having a self-identifying switch function, and a vehicle communications system for detecting the switches. The self-identification feature of the switches enables the placement of switches in any of a number of locations within a defined vehicle network consistent with a customer's desired switch customization requirement, while providing for the identification of a switch regardless of its location, such that switches can be placed in any position on the vehicle within that network without changing the switch's functionality or the system wiring.

Figure 1:
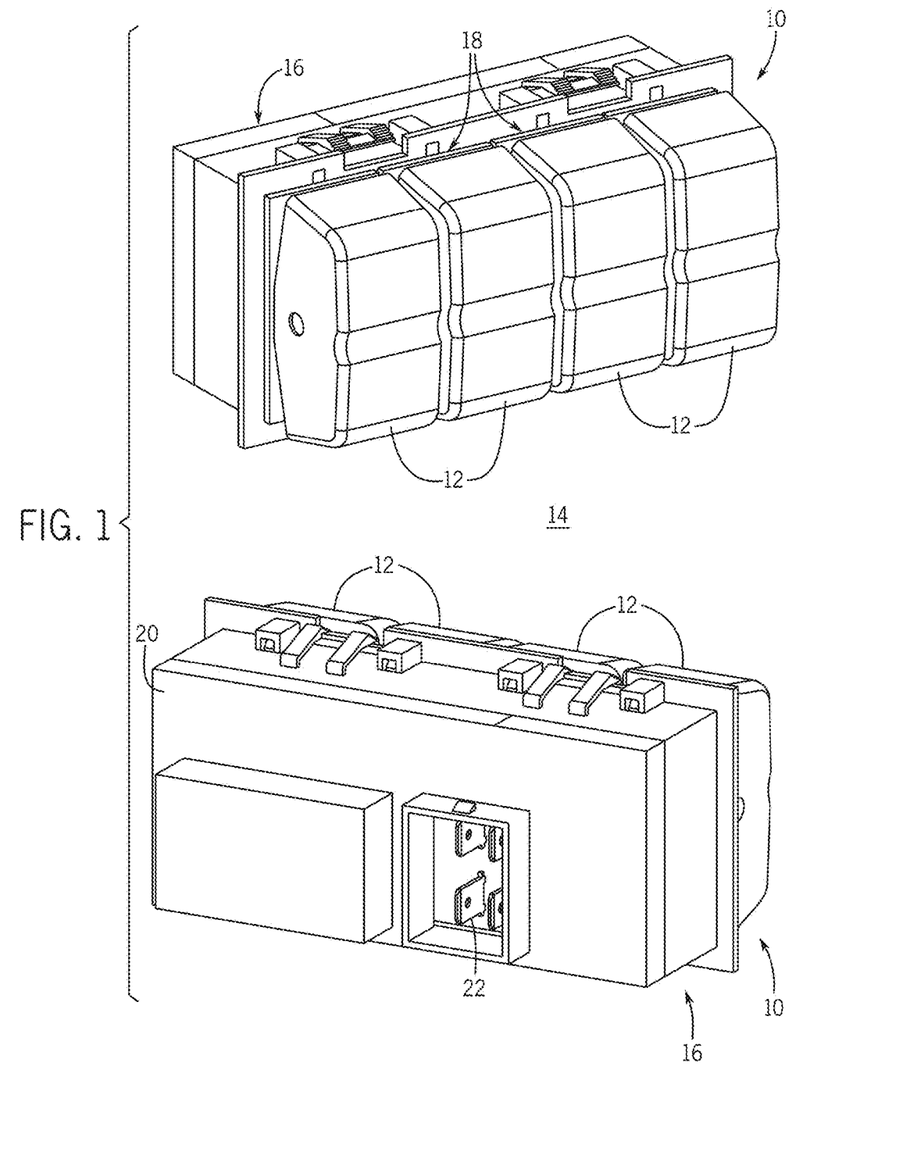
FIG. 1 shows front and rear views of a self-identifying vehicle switch module, according to an embodiment of the invention.

Referring to FIG. 1, the general structure of a switch module 10 having a plurality of switches 12 is shown according to an embodiment of the invention. The switch module 10 is incorporated as part of a dashboard 14 in a motor vehicle, for example in a commercial vehicle, such as a goods vehicle. An operator of the vehicle uses the switches 12 to operate various functions in the vehicle, such as for switching the motor vehicle lighting, the windshield wipers, the diesel fuel heating, or other specialized equipment on the vehicle. In the embodiment illustrated in FIG. 1, the switch module 10 comprises four switches 12; however, it is recognized that a greater or smaller number of switches 12 could be included in the module. For example, a switch module 10 could be provided having eight switches 12—arranged in a single row or in two rows of four, for example. While there is no limit on the number of switches 12 that can be included in switch module 10, it is recognized that for practical purposes—such as responsiveness and speed of switch functioning—the number of switches 12 in an individual module 10 will be limited to a reasonable number so as to maintain a minimum level of vehicle performance.

As further shown in FIG. 1, the switches 12 of switch module 10 are received within a module housing 16 that is fitted in the dashboard 14 of the motor vehicle. The housing 16 is formed as a generally hollow member configured to receive the individual switches 12 therein and includes mating features formed thereon, such as alignment tabs or slots 18, which enable mating of the switches 12 within the housing 16 in the correct orientation. A back surface 20 of the switch module 10 includes a power receptacle 22 formed thereon for enabling powering of the module.

According to embodiments of the invention, the switches 12 included in switch module 10 are configured as self-identifying switches. That is, each of the switches 12 includes data stored thereon regarding a unique address or identifier tying to the icon/function of the switch. Accordingly, the switches 12 may be placed in any of a number of locations in a module 10 and/or on the dashboard 14 consistent with a customer's desired switch customization requirement, while providing for the identification of a switch 12 regardless of its location, such that switches can be placed in any position within a defined network on the vehicle without changing the switch's functionality or the system wiring.

Figure 2:
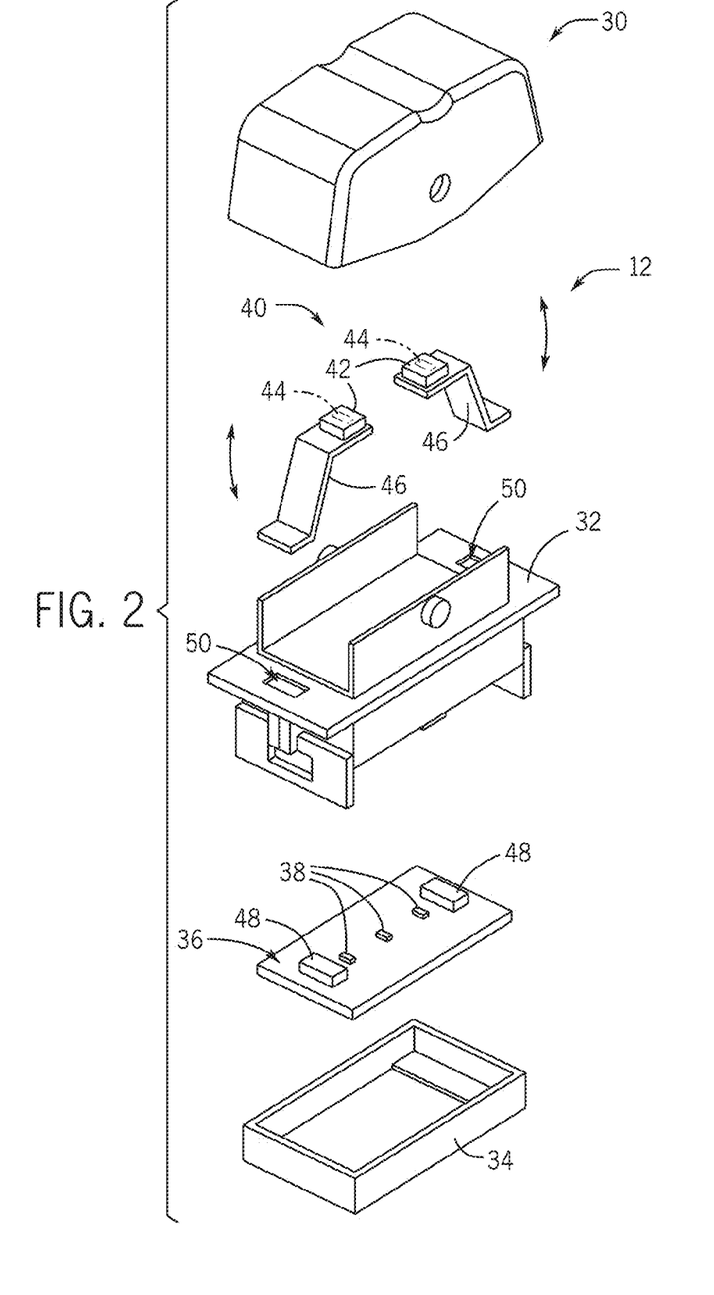
FIG. 2 is an exploded view of a switch included in the switch module of FIG. 1, according to an embodiment of the invention.

Referring now to FIG. 2, an exploded view of an individual switch 12 is shown in more detail. The switch 12 generally includes an operating member 30, a switch frame 32 on which the operating member is mounted, a rear plate 34, and a printed circuit board (PCB) 36 positioned between the switch frame 32 and the rear plate 34. According to an exemplary embodiment, the operating member 30 is in the form of a rocker button that is movable by an operator between an off/neutral position and one or more activated positions, with the rocker button 30 rotating relative to the switch frame 32 responsive to actuation of the button by the operator. In the embodiment of FIG. 2, the switch 12 is constructed as a rocker switch having a neutral position and two activated positions—a first activated position and a second activated position. If the user pushes one side of the rocker button 30, the rocker button 30 is moved to the first activated position and, if the user pushes the other side of the rocker button 30, the rocker button 30 is moved to the second activated position. In one embodiment, light emitting diodes (LEDs) 38 located on the PCB 36 provide illumination of graphic icons on the rockers 30 to provide a visual indication to the user of whether the rocker button 30 is in the neutral position, the first activated position or the second activated position.

Also included in the switch 12 is a radio-frequency identification (RFID) system 40 that includes at least one RFID tag 42, with each RFID tag 42 having data stored thereon regarding a unique identifier or address tying to the icon/function of the respective position of switch 12—such that the switch 12 may function as a self-identifying switch. For example, the identifying data stored on the RFID tags 42 may tie/identify the switch position as functioning to control headlights, hazard lights, windshield wipers, rear windshield heating, cruise control functions, or internal central locking, for example. According to the embodiment of the switch 12 provided in FIG. 2, the RFID system 40 is shown as including two RFID tags 42 therein—one RFID tag for each activated switch position—although it is recognized that only a single RFID tag 42 could be included in the switch 12. In one embodiment, the RFID tags 42 may be affixed to the rocker button 30 on an underside thereof, such as via an adhesive, snap fit engagement, or other suitable means.

Each of the RFID tags 42 contains an integrated circuit (IC) 44 for storing and processing information, modulating and demodulating an RF signal, and other specialized functions, as well as a non-volatile memory (not shown) for storing the tag information, and either fixed or programmable logic for processing the transmission and sensor data, respectively. In an embodiment where the RFID tags 42 are passive tags, i.e., the tags have no battery, the integrated circuit 44 also functions to collect DC power from radio energy transmitted by an RFID reader 56, although it is recognized that the RFID tags may instead be active tags or battery-assisted passive (BAP) tags, as will be explained in greater detail below.

For each RFID tag 42 in switch 12, a switch contact 46 (i.e., contact terminal) is provided that allows for the RFID tag 42 to selectively communicate with a corresponding antenna 48 that, according to one embodiment, is affixed to the PCB 36. That is, a switch contact 46 is electrically coupled to each RFID tag 42 and is movable between "opened" and "closed" positions responsive to actuation of the rocker button 30, such that the contact 46 will selectively provide for a communication path between the RFID tag 42 and its respective antenna 48 when moved to the closed position—with openings 50 being formed in frame 32 to provide for connection of the switch contacts 46 and the antennas 48. When a switch contact 46 is closed, its respective RFID tag 42 will transmit the data stored thereon—i.e., a unique address tying to the icon/function of the switch—to the antenna 48, with the antenna 48 then functioning to send out a wireless signal that includes this data—referred to hereafter as a "switch message." According to one embodiment of the invention, an antenna 48 is provided for each of the RFID tags 42, with each antenna 48 being in selective communication with its respective RFID tag 42; however, it is recognized that an alternative embodiment of the switch 12 could include only a single antenna 48 that would be utilized to broadcast signals for both of the RFID tags 42, with it being understood that no more than one of the RFID tags 42 would ever be in communication with the antenna 48 at any given time.

Figure 3:
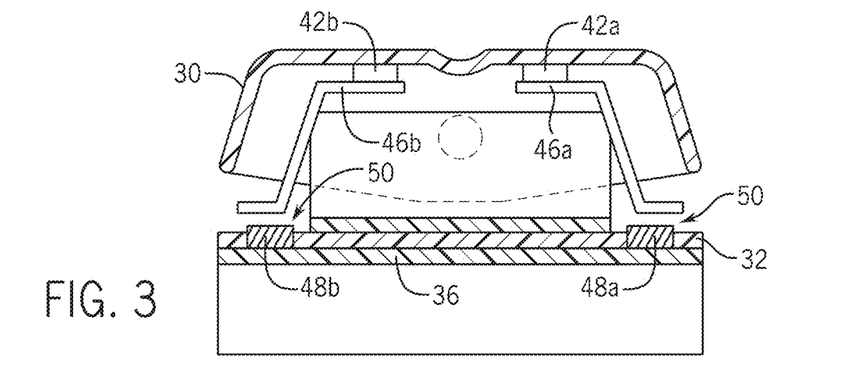
FIGS. 3-5 illustrate a cross-sectional view of the switch of FIG. 2, with the switch in a neutral position, first activated position, and second activated position, respectively.
Figure 4:
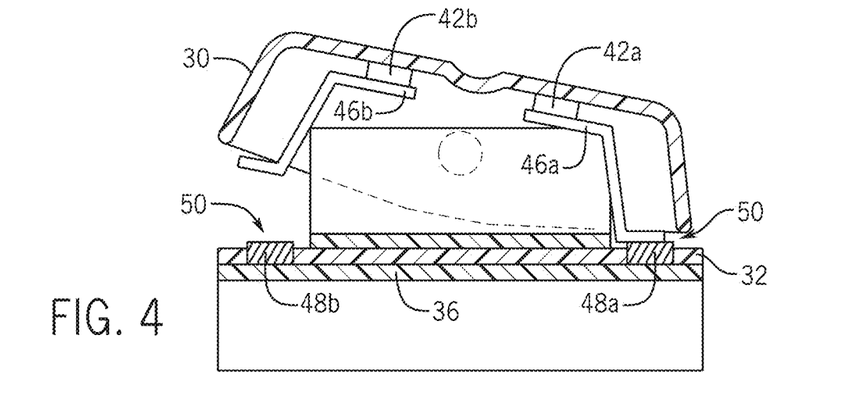
Figure 5:
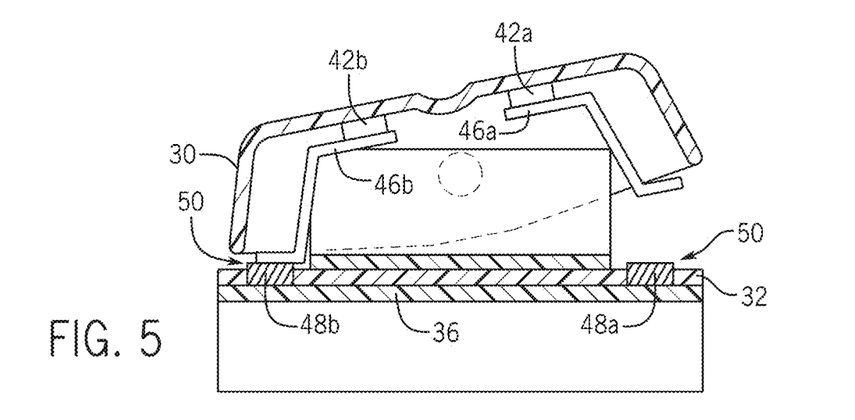

In operation of switch 12, the rocker button 30 is used in order to provide manual switching for the switch contacts 46. Referring to FIGS. 3-5, the switch is shown in each of the neutral position, first activated position and second activated position, with the positioning of the switch contacts 46 relative to antennas 48 being illustrated therein. As shown in FIG. 3, when the rocker button 30 is in the neutral position, then the two switch contacts 46a, 46b are in the switched-off state—separated from antennas 48a, 48b—such that no communication path is provided from the RFID tags 42a, 42b to their respective antennas 48a, 48b. As shown in FIG. 4, if the user pushes one side of the rocker button 30, the rocker button 30 is moved to a first activated position and, in consequence, a first RFID tag 42a and first switch contact 46a on the rocker button 30 are caused to translate downward such that the first switch contact 46a is electrically coupled to the first antenna 48a, such that the data stored on the RFID tag is provided to the antenna 48a and the antenna 48a transmits a wireless switch message that includes the data from the first RFID tag 42a. As shown in FIG. 5, in a second activated position of the rocker button 30, which is reached by pushing the other side of the rocker button 30, the second RFID tag 42b and second switch contact 46b are caused to translate downward such that the second switch contact 46b is electrically coupled to the second antenna 48b, such that the data stored on the RFID tag 42b is provided to the antenna 48b and the antenna 48b transmits a wireless switch message that includes the data from the second RFID tag 42b.

While the switches 12 in switch module 10 are shown and described in FIGS. 2-5 as being rocker switches having a neutral position and two activated positions, it is recognized that the switches 12 could also be constructed as rocker switches having only a neutral/off position and one activated/on position. In such an embodiment, only a single RFID tag 42 and switch contact 46 would be employed—with the switch contact 46 selectively connecting with an antenna 48 to provide a communication path between the RFID tag 42 and the antenna 48. Construction of a switch 12 as a pushbutton switch or toggle switch would similarly operate with there being only a single RFID tag 42 and switch contact 46, and a single respective antenna 48.

Figure 6:
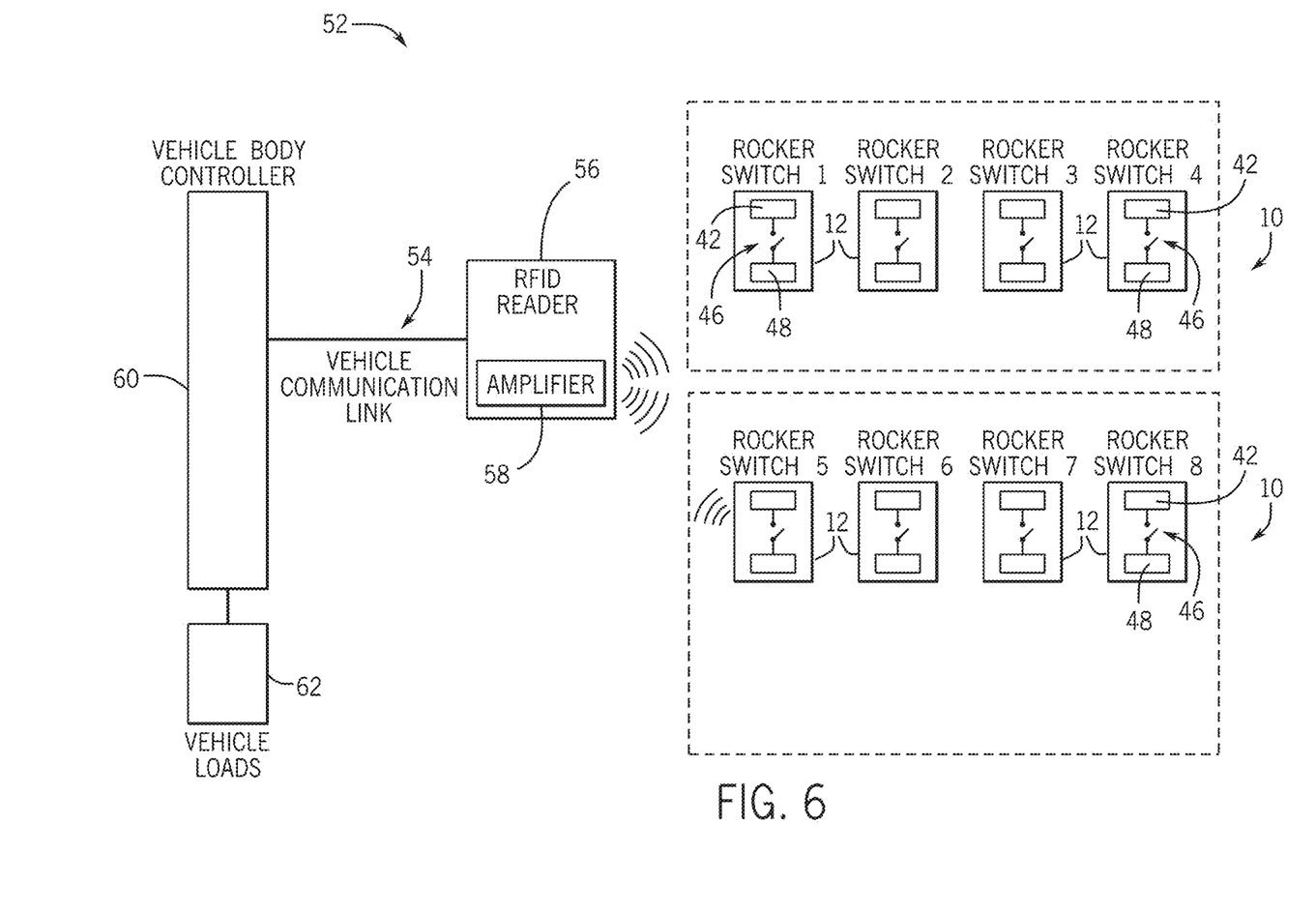
FIG. 6 is a schematic block diagram of a vehicle communication system that includes a plurality of self-identifying vehicle switches, according to an embodiment of the invention.

Referring now to FIG. 6, and with continued reference to FIGS. 1 and 2, a schematic diagram of a vehicle communication system 52 is shown according to an embodiment of the invention. The vehicle communication system 52 includes one or more switch modules 10 each having a plurality of switches 12 therein—such as shown and described in FIGS. 1 and 2—operatively connected to and in communication with a vehicle communication network or link 54, such as a CAN bus or LIN bus for example. That is, the switch modules 10 and switches 12 therein are multiplexed with the vehicle communication network or link 54 communication device (using a CAN or LIN protocol, for example) to interface with other devices on the vehicle.

To provide for communication between the switches 12 and the communication link 54, an RFID reader 56 is operably coupled to the communication link 54 that interacts with the switches 12 to receive information therefrom, with the RFID reader 56 being mountable on the vehicle chassis. In an exemplary embodiment, the RFID reader 56 and RFID tags 42 in switches 12 are provided as an Active Reader Passive Tag (ARPT) system—in which the RFID reader 56 transmits interrogator signals and receives authentication replies (in the form of switch messages) from passive RFID tags 42. In addition to interrogating the RFID tags 42 in order to receive authentication replies therefrom, the RFID reader 56 also functions to power/charge the RFID tags 42. For performing such a charging operation, the RFID reader 56 includes an antenna amplifier 58 that functions to selectively boost the strength of signals transmitted therefrom to the RFID tags 42, with a boosted "charging signal" being, for example, up to roughly a thousand times stronger than the interrogation signals transmitted by the RFID reader 56. The RFID tags 42 use the radio energy in the charging signals to charge components therein, such as the integrated circuit 44 of the RFID tag 42.

While the RFID tags 42 and RFID reader 56 are described above as an ARPT system in which the RFID reader 56 transmits interrogator signals and receives authentication replies from passive RFID tags 42, it is recognized that alternative embodiments could instead provide the RFID tags as active tags or battery-assisted passive (BAP) tags. When provided as active tags having an on-board battery, the RFID tags 42 periodically transmit switch messages out therefrom—i.e., transmit switch messages when their respective switch 12 is in an activated position and the RFID tag 42 is in communication with its antenna 48. When provided as BAP tags, the RFID tags 42 have a small battery on-board and are activated only when interrogated by the RFID reader 56.

In operation, the RFID reader 56 periodically scans the system 52 checking for the presence of RFID tags, with the RFID reader 56 transmitting an encoded radio signal to interrogate RFID tags 42 in the switches 12 of switch modules 10. The RFID reader 56 then detects a switch closure (i.e., a switch in an activated position) by detecting the presence of the RFID tags 42 responsive to the interrogation signal. A switch closure is only detected when the switch contact 46 is in a closed position that connects an antenna 48 to its respective RFID tag 42, with the closure of the switch contact 46 being based on the position of the rocker button 30 of the switch 12. Accordingly, the system logic used by the RFID reader 56 in interrogating the RFID tags 42 would be set forth simply as:

Switch contact closure is TRUE when the RFID reader reports the presence of the RFID tag.

Switch contact closure is FALSE when the RFID reader does not report the presence of the RFID tag.

Those RFID tags 42 that are connected to an antenna 48 by its respective switch contact 46 respond to the RFID reader 56 with a switch message that includes their identification and switch state information, with the RFID reader 56 receiving a switch message from each RFID tag 42 whose switch 12 is in an activated position. As each of the RFID tags 42 has an individual identification or serial number, the RFID reader 56 can discriminate among several RFID tags 42 that might be within the range of the RFID reader 56 and read them simultaneously.

After running the RFID scan, the switch messages received by the RFID reader 56 are provided to the vehicle communication link 54 and a serial message is sent on the communication link. The serial message contains the switch identifier and the switch state for each switch message received from the RFID tags 42. As shown in FIG. 3, the vehicle communication link 54 provides the serial message to a vehicle body controller 60 (i.e., CAN/LIN master controller), with the vehicle body controller 60 interpreting switch messages received from the switches 12—via RFID reader 56—and transmitting a command to the vehicle function/load 62, so as to cause the vehicle function/load to operate in a desired manner—such as sending a command to cause windshield wipers to turn-on.

According to embodiments of the invention, the switch modules 10 can operate within vehicle communication system 52 to identify the presence of a particular switch 12 and the switch's state. Thus, as indicated in FIG. 6 for example, any of "Rocker Switch 1" thru "Rocker Switch 8" could be individually identified to associate an individual identification to each switch 12 and a state of each switch 12. As indicated previously, each switch 12 contains a unique address/identifier associated with the switch function, with such address information being stored on the RFID tag(s) 42 included in the switch 12. The RFID reader 56 receives switch messages from the RFID tags 42 that contains the switch's address/identifier as well as the switch's logic state, and provides these messages in serial to the vehicle body controller 60, such that the vehicle body controller 60 interprets the switch messages for controlling/turning on an associated load/output 62.

Because each RFID tag 42 on a switch 12 contains a unique identifier and the RFID reader 56 receives signals from the RFID tags 42 that include these identifiers, an OEM can place a switch 12 in any position on a vehicle dashboard 14 without changing the switch's functionality. For example, swapping the positions of "Rocker Switch 2" with "Rocker Switch 7" would have no effect on the switches' functionality or the associated system/module wiring. Regardless of the location of Rocker Switch 2, for example, the RFID reader 56 would recognize that it is receiving a switch message from Rocker Switch 2 and that the switch is in either the first activated position or the second activated position, and would relay that information to the vehicle communication link 54 and turn on the appropriate load/output device 62 by way of the vehicle's body controller 60.

Beneficially, embodiments of the invention thus provide self-identifying switches 12 that allow customers to change the location of switches without rewiring their communication system and without comprising switch functionality. The self-identifying switches 12 may be identified regardless of their location by the inclusion of one or more RFID tags therein that identify the switch function and operational state of the switch. The self-identifying switches 12 allow vehicle OEMs to significantly reduce the cost of managing a custom dash board by allowing for one vehicle harness that could handle multiple customer options, reducing the engineering overhead and the wire count associated with a custom dashboard.

Therefore, according to one embodiment of the present invention, a vehicle communication system includes a switch module having a plurality of control switches, each of the plurality of control switches further including a rocker button actuatable between an off position and an activated position and a radio frequency identification (RFID) tag secured to the rocker button, the RFID tag including thereon a unique identifier tied to a function of the control switch. The vehicle communication system also includes an RFID reader configured to receive switch messages from RFID tags whose respective rocker button is in an activated position, each switch message including the unique identifier for its respective RFID tag. The vehicle communication system further includes a vehicle communications link connected to the RFID reader to receive switch messages therefrom, the vehicle communications link providing the switch messages to a vehicle controller for purposes of controlling vehicle outputs associated with the switch messages.

According to another embodiment of the present invention, a vehicle control switch includes a rocker button actuatable between an off position and one or more activated positions and one or more radio frequency identification (RFID) tag secured to an underside of the rocker button, with an RFID tag being provided for each of the one or more activated positions of the rocker button, and wherein each of the one or more RFID tags includes thereon a unique address tied to a function of the control switch in its respective activated position. The vehicle control switch also includes a switch contact coupled to each of the one or more RFID tags and to the rocker button such that the switch contact moves with the rocker button when actuated between the off position and the one or more activated positions and one or more antennas selectively in operable communication with the one or more RFID tags based on a position of the switch contact associated with each respective RFID tag. A communications path between an RFID tag and an antenna is formed by a respective switch contact when the rocker button is in one of the one or more activated positions, thereby causing the antenna to transmit a switch signal to an RFID reader remote from the vehicle control switch, the switch signal including therein the unique address of the RFID tag.

According to yet another embodiment of the present invention, a vehicle communication system includes a plurality of control switches selectively operable to control vehicle functions or loads in a desired manner, each of the plurality of control switches further including a rocker button actuatable between an off position and one or more activated positions, one or more radio frequency identification (RFID) tags secured to an underside of the rocker button each having stored thereon a unique address indicative of a function of the control switch, and one or more antennas operable with the one or more RFID tags to transmit switch messages including the address of the RFID tag indicative of a function of the control switch, wherein actuation of the rocker button between the off position and the one or more activated positions selectively connects and disconnects the one or more antennas from respective ones of the one or more RFID tags. The vehicle communication system also includes an RFID reader configured to transmit interrogator signals to each of the RFID tags in the plurality of control switches and, responsive to the interrogator signals, receive switch messages from each RFID tag connected to its respective antenna based on actuation of the respective rocker button to an activated position, each switch message including the unique address for its respective RFID tag.

The present invention has been described in terms of the preferred embodiment, and it is recognized that equivalents, alternatives, and modifications, aside from those expressly stated, are possible and within the scope of the appending claims.

What is claimed is:

1. A vehicle communication system comprising:
   a switch module including a plurality of control switches, each of the plurality of control switches comprising:
   a rocker button moveable between an off position and an activated position;
   a radio frequency identification (RFID) tag secured to the rocker button, the RFID tag including thereon a unique identifier tied to a function of the control switch;
   a switch contact coupled to the RFID tag and to the rocker button, such that the switch contact moves with the rocker button when actuated between the off position and the activated position; and
   an antenna selectively in operable communication with the RFID tag based on a position of the switch contact;
   an RFID reader configured to receive switch messages from RFID tags whose respective rocker button is in an activated position, each switch message including the unique identifier for its respective RFID tag; and
   a vehicle communications link connected to the RFID reader to receive switch messages therefrom, the vehicle communications link providing the switch messages to a vehicle controller for purposes of controlling vehicle outputs associated with the switch messages;
   wherein the switch contact forms a communications path between the RFID tag and the antenna when in a closed position, the switch contact being moved to the closed position responsive to actuation of the rocker button to the activated position; and
   wherein the antenna generates a switch message for transmission to the RFID reader when the communications path is formed between the RFID tag and the antenna.

2. The vehicle communication system of claim 1 wherein the rocker switch is actuatable between the off position, a first activated position, and a second activated position; and
   wherein the RFID tag comprises a first RFID tag and a second RFID tag, the switch contact comprises a first switch contact coupled to the first RFID tag and a second switch contact coupled to the second RFID tag, and the antenna comprises a first antenna and a second antenna, with the first RFID tag having an identifier tied to a function of the control switch in the first activated position and the second RFID tag having an identifier tied to a function of the control switch in the second activated position.

3. The vehicle communication system of claim 2 wherein the first switch contact forms a communications path between the first RFID tag and the first antenna when moved to its closed position, responsive to actuation of the rocker button to the first activated position; and
   wherein the second switch contact forms a communications path between the second RFID tag and the second antenna when moved to its closed position, responsive to actuation of the rocker button to the second activated position.

4. The vehicle communication system of claim 1 wherein the RFID tag is secured to an underside of the rocker button.

5. The vehicle communication system of claim 1 wherein the vehicle communications link transmits a serial message to the vehicle controller that includes all switch messages received from the plurality of control switches.

6. The vehicle communication system of claim 1 wherein the RFID reader transmits interrogator signals to the RFID tag in each of the plurality of control switches, with the RFID tags generating the switch messages responsive to the interrogator signals.

7. The vehicle communication system of claim 6 wherein the RFID reader further comprises an amplifier operable to selectively boost a strength of the interrogator signals transmitted by the RFID reader, with the boosted interrogator signals providing charging to the plurality of RFID tags such that the RFID tags and the RFID reader form an Active Reader-Passive Tag (ARPT) system.

8. The vehicle communication system of claim 1 wherein the RFID transmits the interrogator signals in a periodic fashion to check for the presence of RFID tags.

9. The vehicle communication system of claim 1 wherein the plurality of switches are interchangable within the switch module without affecting a functionality of the switches or communication thereof with the RFID reader.

10. A vehicle control switch comprising:
   a rocker button actuatable between an off position and one or more activated positions;
   one or more radio frequency identification (RFID) tag secured to an underside of the rocker button, with an RFID tag being provided for each of the one or more activated positions of the rocker button, and wherein each of the one or more RFID tags includes thereon a unique address tied to a function of the control switch in its respective activated position;
   a switch contact coupled to each of the one or more RFID tags and to the rocker button, such that the switch contact moves with the rocker button when actuated between the off position and the one or more activated positions; and
   one or more antennas selectively in operable communication with the one or more RFID tags based on a position of the switch contact associated with each respective RFID tag;
   wherein a communications path between an RFID tag and an antenna is formed by a respective switch contact when the rocker button is in one of the one or more activated positions, thereby causing the antenna to transmit a switch signal to an RFID reader remote from the vehicle control switch, the switch signal including therein the unique address of the RFID tag.

11. The vehicle control switch of claim 10 wherein the one or more RFID tags comprises a first RFID tag and a second RFID tag, the switch contact comprises a first switch contact coupled to the first RFID tag and a second switch contact coupled to the second RFID tag, and the one or more antennas comprises a first antenna and a second antenna.

12. The vehicle control switch of claim 11 wherein the one or more activated positions of the rocker button comprises a first activated position and a second activated position, with:
a communications path being formed between the first RFID tag and the first antenna by the first switch contact when the rocker button is in the first activated position, thereby causing the first antenna to transmit a switch signal to the RFID reader, the switch signal including therein the unique address of the first RFID tag tied to a function of the vehicle control switch in the first activated position; and
a communications path being formed between the second RFID tag and the second antenna by the second switch contact when the rocker button is in the second activated position, thereby causing the second antenna to transmit a switch signal to the RFID reader, the switch signal including therein the unique address of the second RFID tag tied to a function of the vehicle control switch in the second activated position.

13. The vehicle control switch of claim 10 wherein each of the one or more RFID tags comprises a passive tag that transmits, via its associated antenna, a switch signal including therein its unique address only in response to an interrogation signal transmitted by the remote RFID reader.

14. A vehicle communication system comprising:
a plurality of control switches selectively operable to control vehicle functions or loads in a desired manner, each of the plurality of control switches comprising:
a rocker button actuatable between an off position and one or more activated positions;
one or more radio frequency identification (RFID) tags secured to an underside of the rocker button, each RFID tag having stored thereon a unique address indicative of a function of the control switch; and
one or more antennas operable with the one or more RFID tags to transmit switch messages including the address of the RFID tag indicative of a function of the control switch;
wherein actuation of the rocker button between the off position and the one or more activated positions selectively connects and disconnects the one or more antennas from respective ones of the one or more RFID tags; and
an RFID reader configured to:
transmit interrogator signals to each of the RFID tags in the plurality of control switches; and
responsive to the interrogator signals, receive switch messages from each RFID tag connected to its respective antenna based on actuation of the respective rocker button to an activated position, each switch message including the unique address for its respective RFID tag.

15. The vehicle communication system of claim 14 further comprising a vehicle communications link connected to the RFID reader to receive switch messages therefrom, the vehicle communications link providing the switch messages in serial to a vehicle controller for purposes of controlling vehicle outputs associated with the switch messages.

16. The vehicle communication system of claim 14 wherein each of the plurality of control switches further comprises a switch contact coupled to each of the one or more RFID tags, wherein the switch contact moves with the rocker button when actuated between the off position and the one or more activated positions so as to selectively connect and disconnect a respective antenna with a respective RFID tag.

17. The vehicle communication system of claim 14 wherein each of the one or more RFID tags comprises a passive tag that transmits, via its associated antenna, a switch signal including therein its unique address only in response to an interrogation signal transmitted by the RFID reader.

18. The vehicle communication system of claim 17 wherein the RFID reader further comprises an amplifier operable to selectively boost a strength of the interrogator signals transmitted by the RFID reader, with the boosted interrogator signals providing charging to the one or more RFID tags in each control switch.

* * * * *